(12) United States Patent
Yatsugi et al.

(10) Patent No.: US 12,344,540 B2
(45) Date of Patent: Jul. 1, 2025

(54) WASTE SEPARATING SYSTEM, ACTIVATED SLUDGE TREATMENT SYSTEM, WASTE SEPARATING METHOD, AND ACTIVATED SLUDGE TREATMENT METHOD

(71) Applicant: Kubota Corporation, Osaka (JP)

(72) Inventors: Soichiro Yatsugi, Amagasaki (JP); Yoshio Kitagawa, Amagasaki (JP); Shinya Nagae, Tokyo (JP)

(73) Assignee: Kubota Corporation, Osaka (JP)

( * ) Notice: Subject to any disclaimer, the term of this patent is extended or adjusted under 35 U.S.C. 154(b) by 286 days.

(21) Appl. No.: 18/023,516

(22) PCT Filed: Aug. 27, 2021

(86) PCT No.: PCT/JP2021/031493
§ 371 (c)(1),
(2) Date: Feb. 27, 2023

(87) PCT Pub. No.: WO2022/045288
PCT Pub. Date: Mar. 3, 2022

(65) Prior Publication Data
US 2024/0025779 A1    Jan. 25, 2024

(30) Foreign Application Priority Data
Aug. 28, 2020   (JP) ................. 2020-144984

(51) Int. Cl.
*C02F 3/12*    (2023.01)
*C02F 11/02*   (2006.01)

(52) U.S. Cl.
CPC ........... *C02F 3/12* (2013.01); *C02F 11/02* (2013.01); *C02F 2303/06* (2013.01)

(58) Field of Classification Search
CPC ...... C02F 2303/24; C02F 3/1273; C02F 3/12; C02F 2301/046; C02F 2303/06; C02F 2101/105; C02F 1/004; C02F 1/001
USPC ........................................... 210/605
See application file for complete search history.

(56) References Cited

U.S. PATENT DOCUMENTS

2021/0206676 A1    7/2021   Yatsugi et al.

FOREIGN PATENT DOCUMENTS

| JP | 201396204 A | | 5/2013 | |
|----|----|----|----|----|
| JP | 2013096204 A | * | 5/2013 | |
| JP | 2015203289 A | | 11/2015 | |
| JP | 202049432 A | | 4/2020 | |
| WO | WO-2013088097 A1 | * | 6/2013 | ........... C02F 3/02 |

OTHER PUBLICATIONS

Odaka et al. JP 201096204 A, English machine translation, pp. 1-7 (Year: 2013).*

* cited by examiner

*Primary Examiner* — Claire A Norris
(74) *Attorney, Agent, or Firm* — The Webb Law Firm

(57) ABSTRACT

A waste separating system includes: a first waste separating apparatus 4 and a second waste separating apparatus 5 each configured to separate waste S from treatment target water W1, the first waste separating apparatus 4 including a first filter 41 with a first opening size, the second waste separating apparatus 5 including a second filter 51 with a second opening size larger than the first opening size and disposed downstream of the first waste separating apparatus 4.

9 Claims, 2 Drawing Sheets

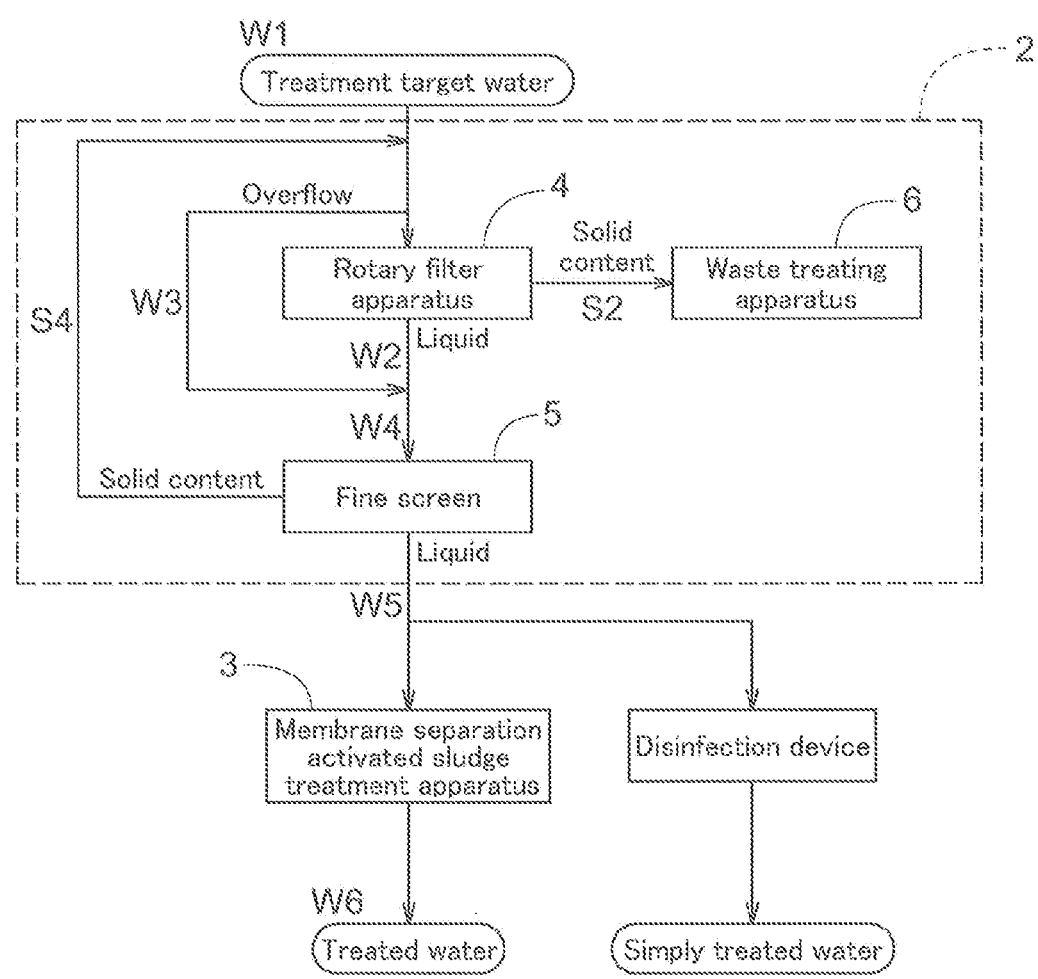

WASTE SEPARATING SYSTEM, ACTIVATED SLUDGE TREATMENT SYSTEM, WASTE SEPARATING METHOD, AND ACTIVATED SLUDGE TREATMENT METHOD

CROSS-REFERENCE TO RELATED APPLICATIONS

This application is the United States national phase of International Application No. PCT/JP2021/031493 filed Aug. 27, 2021, and claims priority to Japanese Patent Application No. 2020-144984 filed Aug. 28, 2020, the disclosures of which are hereby incorporated by reference in their entireties.

BACKGROUND OF THE INVENTION

Field of the Invention

The present invention relates to a waste separating system, an activated sludge treatment system, a waste separating method, and an activated sludge treatment method.

Description of Related Art

Sewage treatment facilities, for example, typically include waste separating apparatuses configured to remove waste from treatment target water. This is because of the need to remove waste from such treatment target water for a quality suitable for an activated sludge treatment facility or the like.

Waste separating apparatuses may be installed such that a plurality of filters with different opening sizes are arranged in series to remove waste more effectively. Japanese Unexamined Patent Application Publication, Tokukai, No. 2013-96204 (Patent Literature 1), for example, discloses a waste removal machine including a coarse screen and a fine screen downstream of the coarse screen. A waste removal facility including a screen and a crusher disposed upstream of the screen to reduce the size of waste to be captured by the screen, as disclosed Japanese Unexamined Patent Application Publication, Tokukai, No. 2015-203289 (Patent Literature 2), is also used commonly.

PATENT LITERATURE

Patent Literature 1

Japanese Unexamined Patent Application Publication, Tokukai, No. 2013-96204

Patent Literature 2

Japanese Unexamined Patent Application Publication, Tokukai, No. 2015-203289

Waste separating apparatuses need to remove waste captured by a filter to prevent the filter from being clogged. The waste removal machine of Patent Literature 1, in view of that, includes a rake for each of the coarse and fine screens to rake off waste. This means that the waste removal machine of Patent Literature 1 requires the same number of waste treating apparatuses as that of filters. The waste removal facility of Patent Literature 2 does not require as many waste treating apparatuses, but instead requires a crusher, leaving room for improvement in terms of the number of pieces of necessary equipment.

SUMMARY OF INVENTION

The above circumstances have led to a demand for a waste separating system, activated sludge treatment system, waste separating method, and activated sludge treatment method that allow reduction in the number of pieces of equipment, area, and cost necessary for operation.

A waste separating system according to the present invention includes: a first waste separating apparatus and a second waste separating apparatus each configured to separate waste from treatment target water, the first waste separating apparatus including a first filter with a first opening size, the second waste separating apparatus including a second filter with a second opening size larger than the first opening size and disposed downstream of the first waste separating apparatus.

An activated sludge treatment system according to the present invention is an activated sludge treatment system including: a waste separating system; and an activated sludge treatment apparatus downstream of the waste separating system, the waste separating system including: a first waste separating apparatus and a second waste separating apparatus each configured to separate waste from treatment target water, the first waste separating apparatus including a first filter with a first opening size, the second waste separating apparatus including a second filter with a second opening size larger than the first opening size and disposed downstream of the first waste separating apparatus.

A waste separating method according to the present invention is a waste separating method for separating waste from treatment target water, the method including: a first separating step of causing treatment target water to flow through a first filter with a first opening size; and a second separating step of causing the treatment target water having passed through the first filter during the first separating step to flow through a second filter with a second opening size larger than the first opening size, wherein the method involves, in response to at least a portion of the treatment target water flowing over during the first separating step, causing the at least a portion of the treatment target water to merge with the treatment target water having passed through the first filter to be subjected to the second separating step.

The above configurations each cause substantially only the first waste separating apparatus to contribute to waste separation in normal circumstances and cause the second waste separating apparatus to contribute to waste separation only in such cases as increased water. This allows the second waste separating apparatus to have a reduced scale and operating cost, and in turn allows reduction in the number of pieces of equipment, area, and cost necessary for operation of the entire system.

A first activated sludge treatment method according to the present invention is an activated sludge treatment method for treatment target water, the method including: a first separating step of causing treatment target water to flow through a first filter with a first opening size; a second separating step of causing the treatment target water having passed through the first filter during the first separating step to flow through a second filter with a second opening size larger than the first opening size; and a treating step of subjecting the treatment target water having passed through the second filter during the second separating step to an activated sludge treatment to produce treated water, wherein the method involves, in response to at least either a nitrogen concentration or phosphorus concentration in the treated water reaching or being expected to reach a nitrogen or phosphorus concentration threshold or higher, selecting an operating condition for the first filter to cause at least a portion of the treatment target water to flow over during the first separating step and causing the at least a portion of the treatment target water to merge with the treatment target water having passed through the first filter to be subjected to the second separating step.

The above configuration eliminates the need to include a separate device or step for adjusting the nitrogen concentration in treated water, and allows the nitrogen concentration in treated water to be adjusted by a relatively simple method of adjusting an operating condition of the first filter.

A second activated sludge treatment method according to the present invention is an activated sludge treatment method for subjecting treatment target water to a membrane separation activated sludge treatment, the method including: a first separating step of causing treatment target water to flow through a first filter with a first opening size; a second separating step of causing the treatment target water having passed through the first filter during the first separating step to flow through a second filter with a second opening size larger than the first opening size; and a treating step of subjecting the treatment target water having passed through the second filter during the second separating step to a membrane separation activated sludge treatment, wherein the method involves, in response to an amount of the treatment target water having passed through the second filter during the second separating step exceeding an amount that the treating step is capable of treating, disinfecting and releasing without the membrane separation activated sludge treatment an excess of the treatment target water over the amount that the treating step is capable of treating.

The above configuration provides simply treated releasable water with a relatively good quality if the system receives treatment target water in an excessive amount and needs to release a portion thereof without an activated sludge treatment.

The description below deals with preferred embodiments of the present invention, which do not serve to limit the scope of the present invention.

A preferred embodiment of the waste separating system according to the present invention is configured such that an overflow water flow path configured to guide, to a position upstream of the second waste separating apparatus, a portion of the treatment target water which portion has flown out of the first waste separating apparatus.

The above configuration allows the waste separating system to automatically start using an overflow water flow path if the entry rate of treatment target water exceeds the treating capacity of the first waste separating apparatus. This reduces the effort to maintain the waste separating system.

A preferred embodiment of the waste separating system according to the present invention is configured such that a return flow path configured to guide, to a position upstream of the first waste separating apparatus, waste that the second filter has captured on a first side at the second waste separating apparatus.

The above configuration allows the first waste separating apparatus to finally capture waste that the second waste separating apparatus has captured. This allows the first waste separating apparatus alone to be provided with a waste treating apparatus, and thereby allows reduction in the number of pieces of necessary equipment.

A preferred embodiment of the waste separating system according to the present invention is configured such that the first waste separating apparatus is a rotary filter.

With the above configuration, the first waste separating apparatus is a waste separating apparatus with a relatively high treating capacity among others commonly used in the related technical field.

A preferred embodiment of the waste separating system according to the present invention is configured such that the second filter includes at least either a bar screen or a mesh panel screen.

With the above configuration, the second waste separating apparatus has a simple structure.

BRIEF DESCRIPTION OF THE DRAWINGS

FIG. 2 is a flowchart illustrating the flow of how treatment target water is treated.

DESCRIPTION OF THE INVENTION

Figure 1:
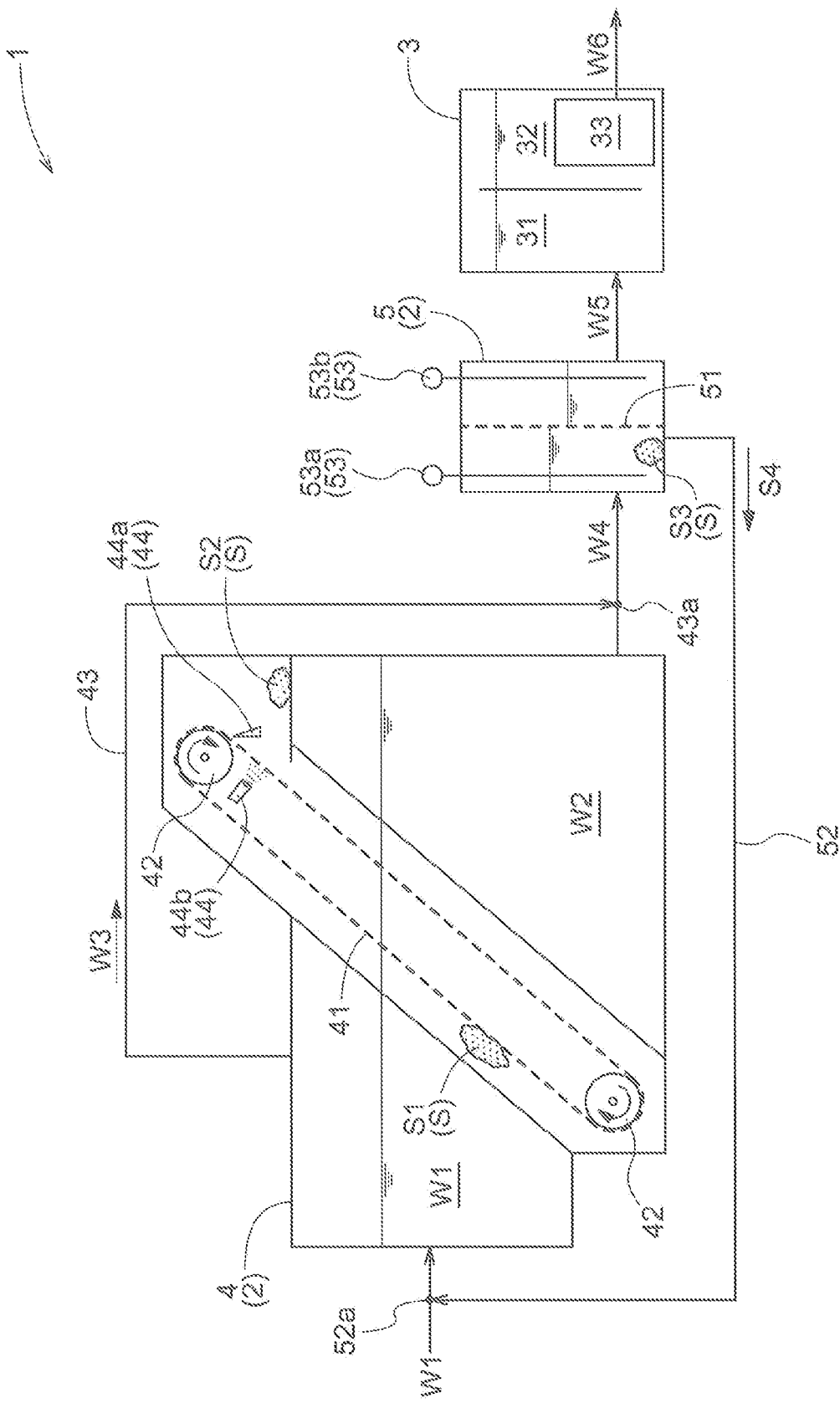
FIG. 1 is a diagram schematically illustrating the configuration of an activated sludge treatment system as an embodiment.

The description below deals with embodiments of the waste separating system, activated sludge treatment system, waste separating method, and activated sludge treatment method according to the present invention with reference to drawings. The embodiment described below of the waste separating system according to the present invention is a waste separating system 2 as an example configured to separate waste in advance from treatment target water to be introduced into a membrane bioreactor 3 included in an activated sludge treatment system 1. The description below uses the term "treatment target water" to refer to water (such as sewage) targeted for an activated sludge treatment and the term "treated water" to refer to water that results from subjecting treatment target water to an activated sludge treatment and that has a quality enough to be released into a river or the like.

[Configuration of Activated Sludge Treatment System]

The activated sludge treatment system 1 includes a waste separating system 2 and a membrane bioreactor 3 (which is an example of the "activated sludge treatment apparatus") (see FIG. 1). The activated sludge treatment system 1 causes the waste separating system 2 to separate waste S from treatment target water W1, causes the membrane bioreactor 3 to subject the resulting water to an activated sludge treatment, and discharges treated water W6 (see FIG. 2).

The membrane bioreactor 3 may be a publicly known one, and is, for the present embodiment, a publicly known membrane bioreactor including an oxygen-free tank 31 and an aerobic tank 32 containing a membrane separation device 33. The waste separating system 2 functions to remove solid matter that has a predetermined size or larger and that may clog the membrane separation device 33.

[Configuration of Waste Separating System]

The waste separating system 2 includes a rotary filter apparatus 4 (which is an example of the "first waste separating apparatus"), a fine screen 5 (which is an example of the "second waste separating apparatus"), and a waste treating apparatus 6 (see FIG. 1). Treatment target water W1 entering the activated sludge treatment system 1 first enters the rotary filter apparatus 4, which separates waste S1 from the treatment target water W1. The resulting treatment target water (primarily treated water W4) then enters the fine screen 5. The treatment target water having passed through the fine screen 5 (secondarily treated water W5) enters the membrane bioreactor 3.

The waste separating system 2 is generally configured to capture waste 51 in treatment target water W1 for separation with use of a filter unit 41 (which is an example of the "first filter") included in the rotary filter apparatus 4 and a mesh panel screen 51 (which is an example of the "second filter") included in the fine screen 5. The filter unit 41 includes a plurality of panel filters joined with one another and each having a opening size within the range of 0.05 mm to 0.5 mm. The mesh panel screen 51 is a mesh screen with a opening size of 2 mm. The upstream rotary filter apparatus 4 thus includes filters each with a opening size smaller than that of the downstream fine screen 5. This means that the treatment target water from which the rotary filter apparatus 4 has separated waste 51 (primarily treated water W4) basically contains no waste that the fine screen 5 is capable of capturing. The waste separating system 2 thus separates waste with sole use of the capacity of the rotary filter apparatus 4 in normal circumstances.

In abnormal circumstances such as the filter unit 41 having been damaged, the fine screen functions to capture waste. The filter unit 41 will, if damaged, let solid matter larger than the opening size of the panel filters pass through the rotary filter apparatus 4. The fine screen 5 will then capture that portion of the solid matter which is larger than the opening size of the mesh panel screen 51. The waste separating system 2 is, in other words, configured such that even in abnormal circumstances such as the rotary filter apparatus 4 having been damaged or receiving treatment target water in an amount larger than expected, the fine screen 5 will exhibit a minimally required waste separating capacity for a pretreatment suitable for an activated sludge treatment by the membrane bioreactor 3.

The description below deals in sequence with the individual apparatuses included in the waste separating system 2. The rotary filter apparatus 4 is a rotary filter waste separating apparatus including a filter unit 41. The filter unit 41 includes a plurality of panel filters joined with one another and each having a opening size within the range of 0.1 mm to 0.5 mm. The rotary filter apparatus 4 includes a plurality of rotors 42 configured to move the panel filters of the filter unit 41.

The rotary filter apparatus 4 is configured such that the filter unit 41 crosses the flow path of treatment target water W1 having entered the rotary filter apparatus 4. The filter unit 41 is configured such that the panel filters are inclined from the upstream side of the flow path of the treatment target water W1 to its downstream side and are moved upward from below by the rotors 42 on a first side, from which the treatment target water W1 enters the rotary filter apparatus 4. The filter unit 41 captures waste 51 in the treatment target water W1 and allows water content of the treatment target water W1 to pass therethrough to provide filtered water W2. The panel filters of the filter unit 41 carry the waste 51 thereon as they are moved. The rotary filter apparatus 4 includes a cleaning mechanism 44 configured to remove the waste 51 from the filter unit 41. The cleaning mechanism 44 includes a scraper 44a configured to scrape waste 51 off the filter unit 41 and a spray 44b configured to spray washing water from the back side of the filter unit 41 to remove waste S1 from the filter unit 41. The rotary filter apparatus 4 carries waste S2 as removed from the filter unit 41 to the waste treating apparatus 6.

The rotary filter apparatus 4 is provided with an overflow water flow path 43. In a case where treatment target water W1 enters the rotary filter apparatus 4 at a rate higher than the amount of treatment target water W1 that the rotary filter apparatus 4 is able to treat per unit time (treating rate), that portion of the treatment target water W1 which the rotary filter apparatus 4 is unable to treat flows over, resulting in overflow water W3 (which is an example of the "portion of the treatment target water which portion has flown out of the first waste separating apparatus"). The overflow water W3 flows through the overflow water flow path 43 to merge with filtered water W2 having passed through the filter unit 41 into primarily treated water W4, which then enters the fine screen 5. More specifically, the overflow water flow path 43 is configured to guide overflow water W3 from the rotary filter apparatus 4 to a predetermined position 43a downstream of the rotary filter apparatus 4 and upstream of the fine screen 5.

The treating rate of the rotary filter apparatus 4 depends on factors based on apparatus arrangements such as the size of the filter unit 41, the opening size of the panel filters, the rotation speed of the filter unit 41, and the method for cleaning the filter unit 41. The treating rate of the rotary filter apparatus 4 may be decreased due to such factors as clogging of the filter unit 41 and a large amount of oil entering the rotary filter apparatus 4, but will not exceed the capacity of the rotary filter apparatus 4 as originally disposed. The entry rate of treatment target water W1 may be changed due to such factors as the season, weather, and time. The activated sludge treatment system 1 is installed with an assumption of a range of the entry rate of treatment target water W1 at the installation place, but may receive treatment target water W1 at a rate beyond the assumed range in a situation of, for instance, unusually heavy rain. Further, selecting a treating rate for the rotary filter apparatus 4 based on the maximum value within the assumed range of the entry rate may result in the rotary filter apparatus 4 having an excessively large scale. The entry rate of treatment target water W1 may thus temporarily exceed the treating rate of the rotary filter apparatus 4 when, for instance, the treating rate of the rotary filter apparatus 4 has been decreased due to the filter unit 41 being clogged or a large amount of oil entering the rotary filter apparatus 4 or when the entry rate of treatment target water W1 has temporarily increased beyond the assumed range.

The fine screen 5 includes a mesh panel screen 51, which is a mesh screen with a opening size of 2 mm. When the fine screen 5 has received primarily treated water W4, the mesh panel screen 51 captures waste S3 in the primarily treated water W4 on a first side and allows water content of the primarily treated water W4 to pass therethrough on a second side. The fine screen 5 thereby discharges secondarily treated water W5, which contains no solid matter that has a predetermined size or larger and that may damage the membrane separation device 33 of the membrane bioreactor 3.

As described above, the primarily treated water W4 contains no waste that the fine screen is capable of capturing except in abnormal circumstances such as the filter unit 41 having been damaged. In a situation where the rotary filter apparatus 4 has let overflow water W3 flow out, however, the primarily treated water W4 contains the overflow water W3. That portion of the primarily treated water W4 which originates from the overflow water W3 may contain solid matter with a size larger than the opening size of the panel filters of the filter unit 41. Such solid matter originally from the overflow water W3 may have a portion larger than the opening size (2 mm) of the mesh panel screen 51. The fine screen 5 separates that portion from the primarily treated water W4 as waste S3 (which is an example of the "waste that the second filter has captured on a first side"). As described above, the present embodiment includes an overflow water flow path 43 configured to automatically guide overflow water to the fine screen 5 in a situation where the rotary filter apparatus 4 has overflowed, and thereby requires no special operation such as switching flow paths. The fine screen 5 then exhibits a minimally required waste separating capacity to separate waste S3 from the overflow water W3.

In a case where the entry rate of treatment target water W1 has increased beyond the assumed range, the membrane bioreactor 3 may receive secondarily treated water W5 in an amount beyond its capacity and unfortunately let a portion of the secondarily treated water W5 be released without a membrane separation activated sludge treatment. Even in such a case, the rotary filter apparatus 4 treats as much treatment target water W1 as possible, while the fine screen 5 separates waste from overflow water W3 at a minimally required level. The resulting water is disinfected and sterilized by a disinfection device into simply treated releasable water with a relatively good quality.

Removing too much solid matter containing organic matter with use of the filter unit 41 may adversely affect the subsequent activated sludge treatment. In such a case, it is desirable to, depending on the situation, cause treatment target water to pass not through the panel filters of the filter unit 41 but through the fine screen 5 alone and then flow downstream into the activated sludge treatment apparatus. The present embodiment is capable of such an operation by intentionally causing overflow water W3. Specifically, slowing down or stopping the rotation of the filter unit 41 (which is an example of the "operating condition for the first filter") of the rotary filter apparatus 4 causes the filter unit 41 to be clogged intentionally, which in turn causes overflow water W3. As such, the present embodiment is configured such that simply controlling the rotation of the filter unit 41 freely controls the amount of organic matter to be supplied to the subsequent activated sludge treatment. There may be a case where, for instance, at least either the concentration of nitrogen or that of phosphorus in treated water W6 has reached a nitrogen or phosphorus concentration threshold or higher as a result of insufficiency of organic matter necessary for denitrification and dephosphorization or is expected by machine-learned AI based on operation history to reach the nitrogen or phosphorus concentration threshold or higher within half a day. The present embodiment may, in such a case, be operated to slow down or stop the rotation of the filter unit 41 in a case where and then speed up or resume the rotation of the filter unit 41 in response to the concentration of nitrogen or that of phosphorus in treated water W6 starting to decrease. Conventional waste separating systems require including a dedicated bypass water path and switching flow paths with use of an electrically operated water gate or movable weir for overflow to control the amount of organic matter as described above.

The fine screen 5 is provided with a return flow path 52 that has a base end on the first side of the mesh panel screen 51 and that is in the form of, for example, a flowing water trough. The mesh panel screen 51 captures waste S3, which the return flow path 52 guides together with a portion of the primarily treated water W4 and washing water for the mesh panel screen 51 to a predetermined position 52a upstream of the rotary filter apparatus 4 as a waste return flow S4. The waste return flow S4 enters the rotary filter apparatus 4 on the first side together with treatment target water W1. The rotary filter apparatus 4 finally removes the waste S3 in the waste return flow S4 from the filter units 41 and carries the waste S3 to the waste treating apparatus 6 as waste S2. This configuration allows a single waste treating apparatus 6 is commonly used by the rotary filter apparatus 4 and the fine screen 5, and thereby reduces, for example, the area necessary for installation of a waste treating apparatus 6 and the cost of installation and operation thereof.

The fine screen 5 includes two water gauges 53, namely a water gauge 53a on the first side of the mesh panel screen 51 and a water gauge 53b on the second side thereof. If, for instance, the mesh panel screen 51 has been clogged, the water gauge 53a (on the first side) will detect a water level higher than the water level that the water gauge 53b (on the second side) will detect. In view of that, the fine screen 5 is configured to clean the mesh panel screen 51 with washing water in response to a predetermined threshold being exceeded by the difference between the respective water levels that the water gauges 53a and 53b detect. The fine screen 5 may return the washing water to the rotary filter apparatus 4 as a waste return flow S4.

The waste treating apparatus 6 is a waste treating apparatus publicly known in the related technical field.

The description below deals again with the flow of how the waste separating system 2 treats treatment target water W1, with reference to FIG. 2. Treatment target water W1 entering the waste separating system 2 first enters the rotary filter apparatus 4. The treatment target water W1 passes through the filter units 41 to become filtered water W2, and may partially flow out of the rotary filter apparatus 4 as overflow water W3 (if the entry rate of the treatment target water W1 exceeds the treating capacity of the rotary filter apparatus 4). The filtered water W2 and the overflow water W3 enter the fine screen 5 as primarily treated water W4. The primarily treated water W4 passes through the mesh panel screen 51 of the fine screen 5 to become secondarily treated water W5 and be subjected to an activated sludge treatment by the membrane bioreactor 3.

The rotary filter apparatus 4 captures solid content in the treatment target water W1 on the first side of the filter units 41. The rotary filter apparatus 4 then removes the solid content from the filter units 41 and carries the solid content to the waste treating apparatus 6 as waste S2. The fine screen 5 captures solid content in the primarily treated water W4 on the first side of the mesh panel screen 51. The fine screen 5 then guides the solid content to the first side of the rotary filter apparatus 4 as a waste return flow S4. The rotary filter apparatus 4 finally carries the solid content to the waste treating apparatus 6 as waste S2.

Alternative Embodiments

Finally, the description below deals with alternative embodiments of the waste separating system, activated sludge treatment system, waste separating method, and activated sludge treatment method according to the present invention. The arrangements disclosed for the embodiments below may each be combined with an arrangement disclosed for another embodiment, as long as such a combination does not cause a contradiction.

The embodiment described above is an example including a rotary filter apparatus 4 as the first waste separating apparatus and a fine screen 5 as the second waste separating apparatus. The first and second waste separating apparatuses for the present invention are, however, not limited in terms of how to separate waste. The first waste separating apparatus may, for instance, be based on a waste separating system such as a system including a cylindrical drum or rotary disc, while the second waste separating apparatus may be based on a waste separating system such as a system including a bar screen or rotary drum screen.

Similarly, the filter units 41 and the mesh panel screen 51 are mere examples of the first filter and the second filter, respectively. The first and second filters are any filters suitable for the respective waste separating systems of the first and second waste separating apparatuses; for example, the first filter may be a filter with raised fiber, while the second filter may be a bar screen.

The embodiment described above is an example in which the rotary filter apparatus 4 is provided with an overflow water flow path 43. The present invention may alternatively be provided with no overflow water flow path. In this case, the present invention should preferably include a flow rate adjustment tank or the like upstream of the first waste separating apparatus to prevent the first waste separating apparatus from overflowing.

The embodiment described above is an example in which the fine screen 5 is provided with a return flow path 52. The present invention may alternatively be provided with no return flow path.

The embodiment described above is an example in which the activated sludge treatment system 1 includes a membrane bioreactor 3. The activated sludge treatment apparatus for the present invention is, however, not necessarily a membrane bioreactor.

Embodiments of any arrangement other than the above that are disclosed in the present specification are also mere examples in all respects, and do not limit the scope of the present invention. A person skilled in the art will easily understand that the embodiments may be modified as appropriate without departing from the object of the present invention. Embodiments modified as such are also naturally within the scope of the present invention.

INDUSTRIAL APPLICABILITY

The present invention is applicable to, for example, a waste separating system for an activated sludge treatment facility.

REFERENCE SIGNS LIST

1 Activated sludge treatment system
2 Waste separating system
3 Membrane bioreactor
31 Oxygen-free tank
32 Aerobic tank
33 Membrane separation device
4 Rotary filter apparatus
41 Filter unit
42 Rotor
43 Overflow water flow path
44 Cleaning mechanism
44*a* Scraper
44*b* Spray
5 Fine screen
51 Mesh panel screen
52 Return flow path
53 Water gauge
6 Waste treating apparatus
S Waste
W1 Treatment target water
W2 Filtered water
W3 Overflow water
W4 Primarily treated water
W5 Secondarily treated water
W6 Treated water

The invention claimed is:

1. A waste separating system, comprising:
a first waste separating apparatus and a second waste separating apparatus each configured to separate waste from treatment target water,
the first waste separating apparatus comprising a first filter with a first opening size,
the second waster separating apparatus comprising a second filter with a second opening size larger than the first opening size and disposed downstream of the first waste separating apparatus,
the waste separating system further comprising:
an overflow water flow path configured to guide, to a position upstream of the second waste separating apparatus, a portion of the treatment target water which portion has flown out of the first waste separating apparatus.

2. The waste separating system according to claim 1, wherein the first waste separating apparatus is a rotary filter.

3. The waste separating system according to claim 1, wherein the second filter includes at least either a bar screen or a mesh panel screen.

4. A waste separating system, comprising:
a first waste separating apparatus and a second waste separating apparatus each configured to separate waste from treatment target water,
the first waste separating apparatus comprising a first filter with a first opening size,
the second waster separating apparatus comprising a second filter with a second opening size larger than the first opening size and disposed downstream of the first waste separating apparatus,
the waste separating system further comprising:
a return flow path configured to guide, to a position upstream of the first waste separating apparatus, waste that the second filter has captured on a first side at the second waste separating apparatus.

5. The waste separating system according to claim 4, wherein the first waste separating apparatus is a rotary filter.

6. The waster separating system according to claim 4, wherein the second filter includes at least either a baser screen or a mesh panel screen.

7. A waste separating method for separating waste from treatment target water, the method comprising:
a first separating step of causing treatment target water to flow through a first filter with a first opening size; and
a second separating step of causing the treatment target water having passed through the first filter during the first separating step to flow through a second filter with a second opening size larger than the first opening size, and
wherein the method comprises, in response to at least a portion of the treatment target water flowing over during the first separating step, causing the at least a portion of the treatment target water to merge with the treatment target water having passed through the first filter to be subjected to the second separating step.

8. An activated sludge treatment method for treatment target water, the method comprising:
a first separating step of causing treatment target water to flow through a first filter with a first opening size;
a second separating step of causing the treatment target water having passed through the first filter during the first separating step to flow through a second filter with a second opening size larger than the first opening size; and a treating step of subjecting the treatment target water having passed through the second filter during the second separating step to an activated sludge treatment to produce treated water, and wherein the method comprises, in response to at least either a nitrogen concentration or phosphorus concentration in the treated water reaching or being expected to reach a nitrogen or phosphorus concentration threshold or higher, selecting an operating condition for the first filter to cause at least a portion of the treatment target water to flow over during the first separating step and causing the at least a portion of the treatment target water to merge with the treatment target water having passed through the first filter to be subjected to the second separating step.

9. An activated sludge treatment method for subjecting treatment target water to a membrane bioreactor, the method comprising:

a first separating step of causing treatment target water to flow through a first filter with a first opening size;

a second separating step of causing the treatment target water having passed through the first filter during the first separating step to flow through a second filter with a second opening size larger than the first opening size; and a treating step of subjecting the treatment target water having passed through the second filter during the second separating step to a membrane bioreactor, and wherein the method comprises, in response to an amount of the treatment target water having passed through the second filter during the second separating step exceeding an amount that the treating step is capable of treating, disinfecting and releasing without the membrane bioreactor an excess of the treatment target water over the amount that the treating step is capable of treating.

* * * * *